May 6, 1941.  G. NELSON  2,241,269
INTERLOCKING MECHANISM
Original Filed April 16, 1937   6 Sheets-Sheet 1

Gunnar Nelson
Inventor
By Earl Benst
His Attorney

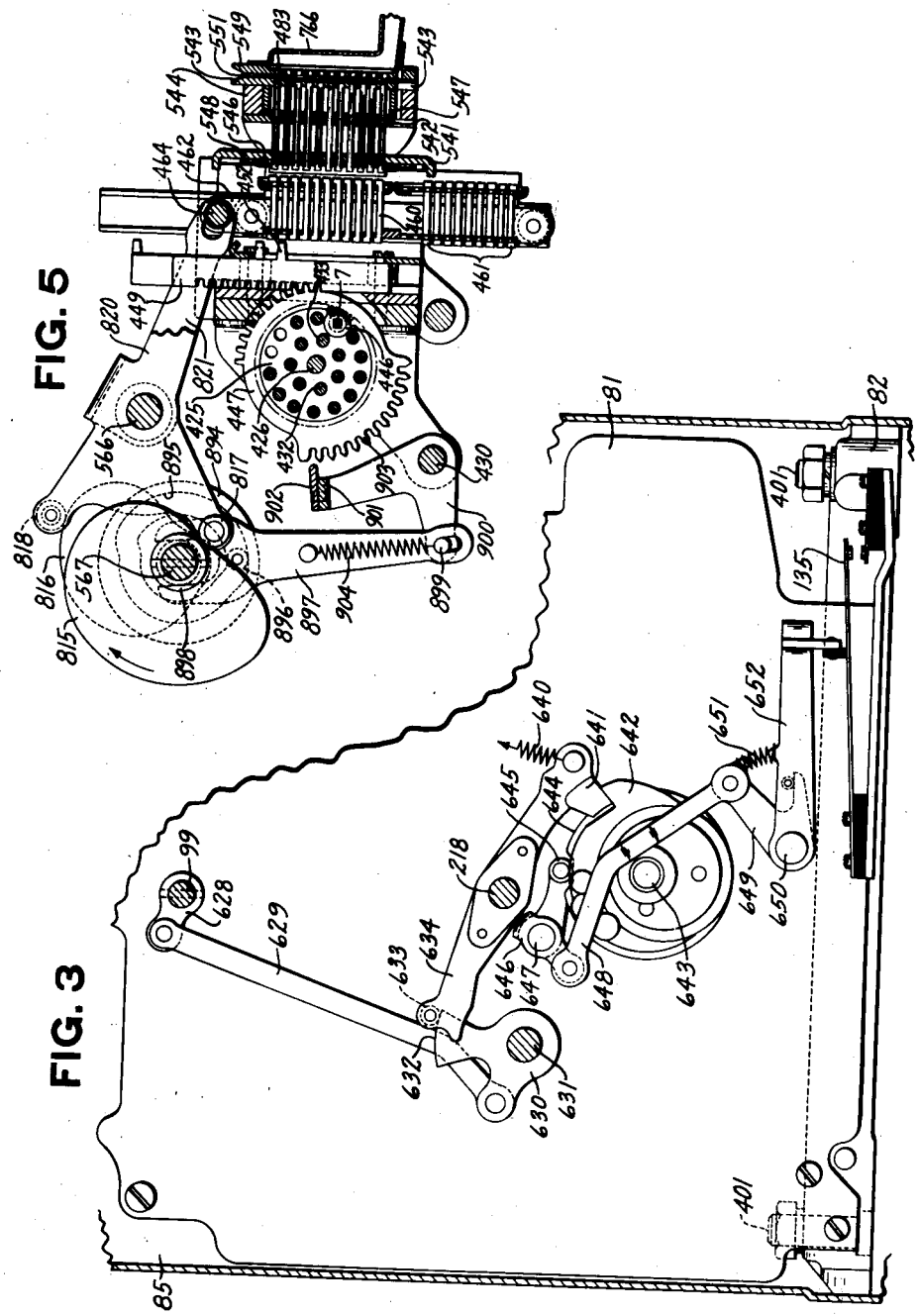

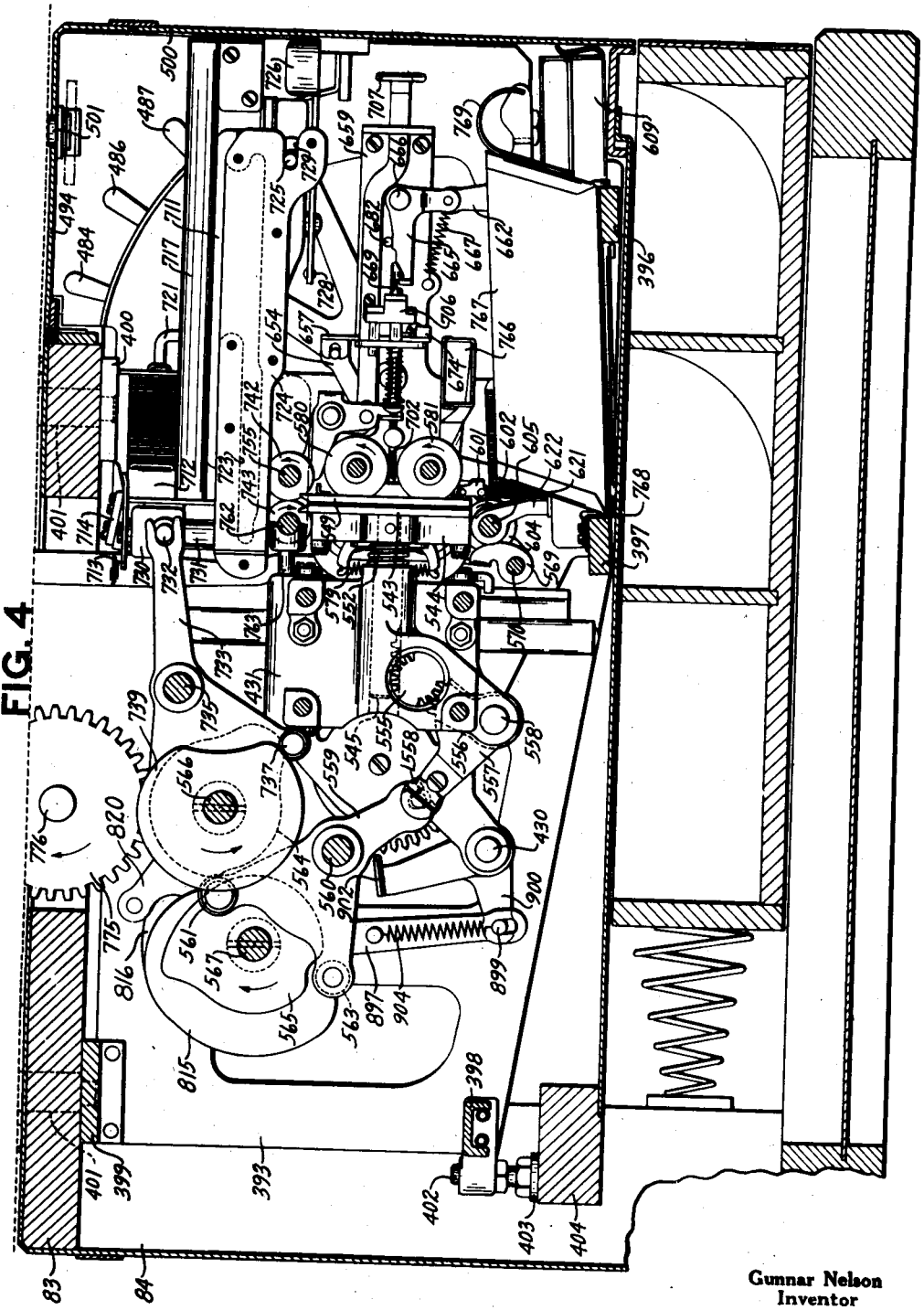

May 6, 1941.                G. NELSON                2,241,269
                        INTERLOCKING MECHANISM
              Original Filed April 16, 1937     6 Sheets-Sheet 4

Gunnar Nelson
Inventor

By *Earl Beust*

His Attorney

May 6, 1941. G. NELSON 2,241,269
INTERLOCKING MECHANISM
Original Filed April 16, 1937   6 Sheets-Sheet 5
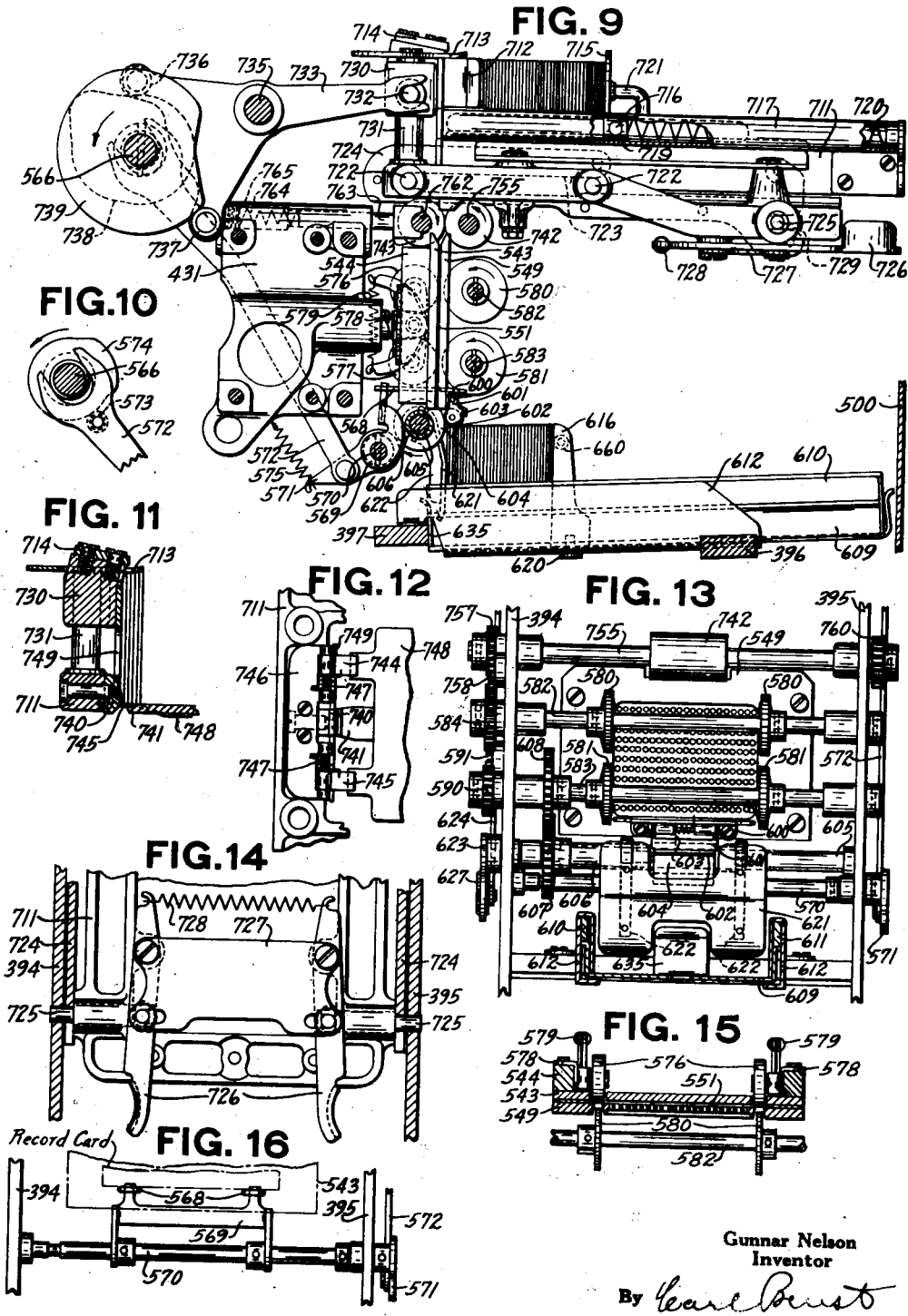
Gunnar Nelson
Inventor
By Earl Brust
His Attorney May 6, 1941.  G. NELSON  2,241,269
INTERLOCKING MECHANISM
Original Filed April 16, 1937   6 Sheets—Sheet 6
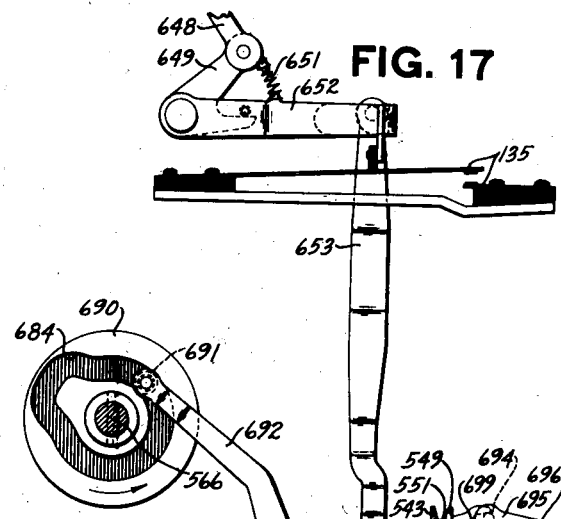
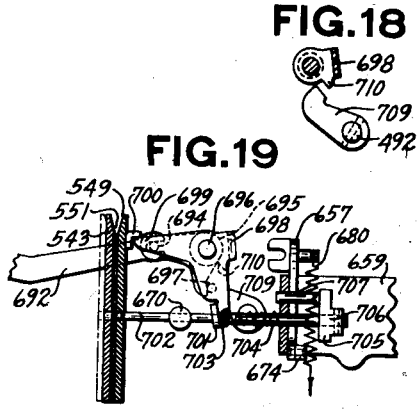
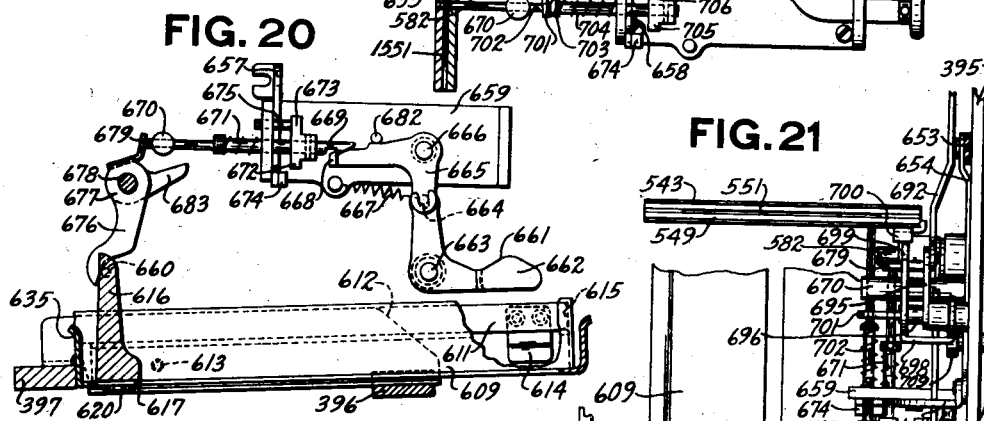
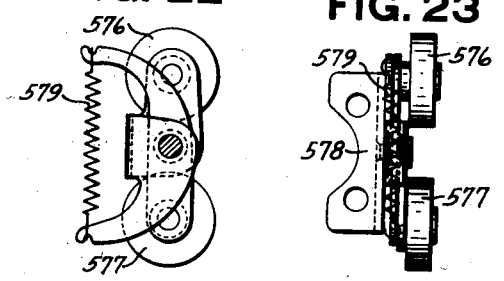
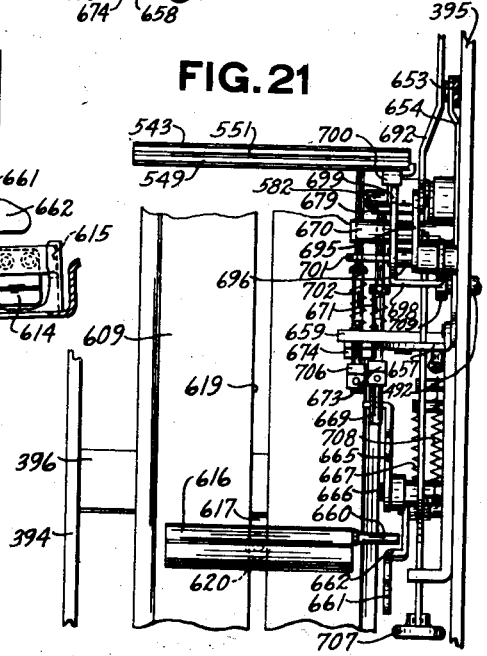
Gunnar Nelson
Inventor
By Carl Benst
His Attorney Patented May 6, 1941

2,241,269

UNITED STATES PATENT OFFICE 2,241,269

INTERLOCKING MECHANISM

Gunnar Nelson, Dayton, Ohio, assignor to The National Cash Register Company, Dayton, Ohio, a corporation of Maryland Original application April 16, 1937, Serial No. 137,223. Divided and this application May 3, 1940, Serial No. 333,175

13 Claims. (Cl. 164—113)

This invention relates to novel interlocking means used in a machine comprising a cash register or accounting machine combined with a punching mechanism, to prevent an operation of the machine when a record card is not in position to be punched or when too many punched cards are in a receiving tray associated with the punching mechanism.

The present application is a division of an application for Letters Patent of the United States, Serial No. 137,223, filed by Gunnar Nelson on April 16, 1937.

In the instant embodiment of the invention, the card supply, card feeding means, and card receiving tray are located within the cabinet of the machine and are not visible from the outside of the machine. It is highly desirable that a punched card be made for each transaction entered upon the cash register or accounting machine, so that the transactions recorded by the cash register or accounting machine will correspond to the cards punched. To prevent an operation of the machine when the card supply has been exhausted, or when no record card is in punching position or when the receiving tray for the punched cards is too full to allow proper feeding of cards through the punching means, novel interlocking means is provided.

It is an object of this invention, therefore, to provide means to prevent the motor from operating the machine when the card supply has become exhausted.

Another object of this invention is to provide means to sense or feel whether or not a record card is in a position to be punched and to prevent an operation of the machine if a card is not in a position to be punched.

Another object of the invention is to provide a means to prevent an operation of the machine if the feeding means for the record cards has not fed a card into position to be punched.

A further object of the invention is to provide a manipulative member to restore the preventing means to enable the machine to be operated when the difficulty which prevented the machine from operating has been cleared up.

A further object of the invention resides in the provision of means to prevent the operation of the machine when the card receiving tray becomes filled to capacity.

A still further object of the invention is to provide novel means to restore the preventing means to ineffective position, when the cards have been removed from the card receiving tray, to enable further operation of the machine.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings:

Fig. 3 is a left side elevation of the machine, with certain parts omitted to show more clearly the controls for the clutch for the machine and the motor switch.

Fig. 4 is a left side elevation of certain parts of the punching mechanism.

Fig. 5 is a left side view of the punching mechanism.

Fig. 9 is a left side elevation showing in particular the supply magazine in which the cards are stored prior to being acted upon by the punching mechanism, the tray for receiving the cards after they have been acted upon by the punching mechanism, and the card feeding and ejecting mechanisms.

Fig. 10 is a detail view of the cam and the pitman associated therewith for operating the card stop bars.

Fig. 11 is a sectional view of the mechanism that picks the cards out of the supply magazine and presents them to the card feeding mechanism.

Fig. 12 is a bottom view of a part of the card picker mechanism.

Fig. 13 is a front view of the card feeding mechanism and a section of the card receiving tray.

Fig. 14 is a detail view of the pinch lever mechanism for securing the card supply magazine in feeding position.

Fig. 15 is a detail view of one set of card feeding rollers and their associated pressure rollers.

Fig. 16 is a front view of the card stop device for locating the cards in punching position.

Fig. 17 is a left side elevation of the feeler mechanism that prevents operation of the machine when no card is in the throat of the punching mechanism.

Fig. 18 is a detail view of a part controlled by the on-and-off mechanism for the card punching device.

Fig. 19 is a detail view of the feeler mechanism shown in Fig. 17.

Fig. 20 is a detail view of the mechanism that renders the machine inoperative when the card tray is filled.

Fig. 21 is a plan view of the mechanisms shown in Figs. 17 and 20.

Figs. 22 and 23 are respectively side views and back views of one set of pressure rollers for the card feeding mechanism.

General Description

Figure 1:
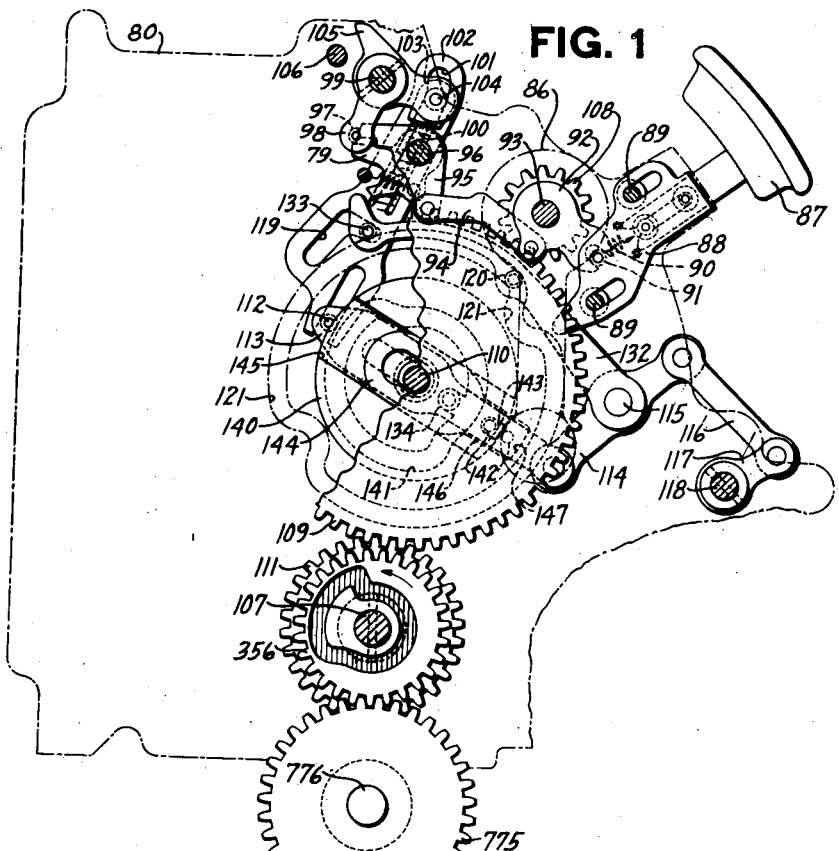
Fig. 1 is a side elevation as observed from the left of the machine, illustrating the mechanism for releasing the machine for operation and certain driving connections and controls therefor.

The machine in which the instant invention is embodied comprises a cash register or accounting mechanism and a punching mechanism for punching records of various transactions entered into the cash register or accounting mechanism. A single source of power is provided to drive the various mechanisms, and an operation of the machine is initiated by a machine release means which causes a clutch to connect the source of power to the machine and also closes a switch to render the source of power operative.

The novel interlock comprises means to prevent the switch from closing whenever there is no card in position to be punched and means to prevent the switch from closing after the card receiving tray is full of punched cards.

The failure of the machine to operate when the release means is operated will notify the operator that one of the following conditions exists—either there is no card in punching position due to the exhaustion of the card supply or to the failure of the card feeding means to position a card in punching position, or there are too many punched cards in the card receiving tray.

After the condition which has prevented the operation of the machine has been determined, the machine can be made to operate by a manipulative device which restores the interlock to normal position, or by removing the punched cards from the tray, whichever condition caused the interlock to operate.

It is thus seen that the interlock will notify the operator whenever the condition of the cards in the punching means is such that proper records will not be made on the cards and will prevent the making of entries into the cash register or accounting machine without cards being punched according to these entries.

The mechanism referred to above in general will now be described in detail.

Detailed Description

The interlocking mechanism which is the feature of this invention is incorporated in a punching mechanism associated with a well-known type of cash register. The details of the punching mechanism and the cash register which are not necessary to an understanding of this invention will not be described herein; however, reference may be had to the parent case for these details if they are desired.

Framework of the machine

The mechanism of the cash register portion of the machine is supported between a right frame 80 and a left frame 81 (Figs. 1 and 3), both of which are secured to a machine base 82 in turn attached to the top 83 of a drawer cabinet 84 (Fig. 4). The entire machine is enclosed in a suitable case or cabinet 85, which is secured to the top of the drawer cabinet. A back plate (not shown) and various cross rods, bars, and shafts, extending between the frames 80 and 81, assist in supporting the various mechanisms and in holding said frames rigid.

Operating mechanism for the machine

The present machine is preferably operated by means of the usual electric motor (not shown). However, if desired, or if made necessary by failure of the electric current, the machine may be manually operated by means of a crank 86, shown in dot-and-dash lines in Fig. 1. Whether the machine is operated electrically or manually, the operation is initiated by depression of a starting bar 87 (Fig. 1). Depressing the starting bar 87, which is removably connected to a plate 88 slidably mounted on the frame 80 by means of parallel slots therein, in cooperation with studs 89 secured in said frame, moves said plate 88 downwardly against the tension of a spring 90. Downward movement of the plate 88 causes a stud 91 therein to cooperate with the bifurcated end of a crank 92 and rock said crank clockwise on its pivot 93 secured to the frame 80. Clockwise movement of the crank 92, by means of a connecting link 94, imparts similar movement to a release pawl 95 loosely supported on a shaft 96 journaled in the frames 80 and 81. Clockwise movement of release pawl 95 moves the rearward end thereof out of the path of an arcuate surface on a half-round stud 97 secured in the lower end of a crank 98 fast to a key lock shaft 99 journaled in the frames 80 and 81.

This releases the shaft 99 to the action of a compressed spring 100, which imparts a slight counter-clockwise movement to said shaft 99. The spring 100 fits loosely over a tongue in the slot 101 in a key release link 102 and over a tongue on a link 103, the upper end of which is loosely supported on a stud 104 secured in one arm of a crank 105 fast on the right-hand end of the key lock shaft 99. It is therefore evident that when the release pawl 95 retains the key lock shaft 99 in untripped position, the spring 100 is compressed, and, as soon as said release pawl is moved out of the path of the stud 97, by depression of the starting bar 87, the spring 100 immediately rocks the shaft 99 counter-clockwise until such movement is arrested by an extension of the crank 105 contacting a stationary stud 106 in the frame 80.

The operating motor is connected, by a train of gears (not shown) and a clutch mechanism shown in Fig. 3 and later to be described, to a main shaft 107 (Fig. 1) journaled in the frames 80 and 81. Counter-clockwise movement of the shaft 99 closes a switch 135 (Figs. 3 and 17) for the motor and renders the clutch mechanism effective to cause the motor to be operatively connected to the main shaft 107 to rotate said shaft clockwise one revolution in adding operations and two revolutions in total and sub-total recording operations. After the shaft 107 has completed the necessary number of revolutions to effect the type of operation being performed, the key lock shaft 99 is restored clockwise to untripped position, thus permitting the spring 90 to return the starting bar 87 upwardly and the release pawl 95 counter-clockwise in the path of the stud 97 to restrain releasing movement of the shaft 99.

The crank 86 (Fig. 1) has integral therewith a gear 108, which meshes with a large gear 109 loose on a stud 110 in the right frame 80, and said gear 109 meshes with a gear 111 secured on the main shaft 107. Through this gearing the main shaft 107 may be revolved by the crank 86 when it is desired to operate the machine by hand.

Restoration of key lock shaft

The key lock shaft 99 is restored at the end of operations in the following manner: The lower end of the link 102 is slotted to embrace a stud 112 in a pitman 113 having therein a slot which fits loosely over the stud 110. The lower end of the pitman 113 is pivotally connected to one end of a lever 114 loose on a stud 115 in the frame 80, and the upper end of said lever 114 is connected by a link 116 to a crank 117 fast on a zero stop throwout shaft 118 journaled in the frames 80 and 81. The zero stop throwout shaft 118 functions only in total and sub-total recording operations to cause the machine to operate through the two cycles necessary to perform these operations. The manner in which the control of this shaft is accomplished is well known and reference to the parent case may be had for details of this mechanism. Loose on the stud 115 is a lever 132 carrying a stud 133, which cooperates with an inverted L-shaped slot 119 in the link 102. The lever 132 carries a roller 120 which engages a camming groove 121 cut in the face of the gear 109, said camming groove having diametrically opposed identical camming portions.

During adding operations, the link 102 is positioned as shown in Fig. 1 to engage the substantially horizontal portion of the slot 119 with the stud 133. Adding operations consist of one cycle of movement or one counter-clockwise revolution of the main shaft 107, which, by means of the gear 111, drives the gear 109 one-half revolution. Near the end of the one-half revolution clockwise of the gear 109, one of the diametrically opposed camming portions of the groove 121, in cooperation with the roller 120, rocks the lever 132 first counter-clockwise and back to normal position. Counter-clockwise movement of the lever 132, by means of the stud 133, in cooperation with the slot 119, shifts the link 102 downward, causing the slot 101, in cooperation with the stud 104, to restore the key lock shaft 99 clockwise to untripped position. After the shaft 99 has been restored fully clockwise to normal position, the release pawl 95 is spring-returned into the path of the stud 97 to retain said key lock shaft in restored position.

Non-repeat mechanism

In case the starting bar 87 (Fig. 1) is accidentally or inadvertently retained depressed at the end of a machine operation, a repeat operation of the machine is prevented by means of a non-repeat pawl 79 fulcrumed on the shaft 96, said pawl being spring-urged into the path of the stud 97 upon restoration of the key lock shaft to obstruct further releasing movement of said shaft. This prevents the machine from functioning until the starting bar 87 is released and returned upward by the spring 90. When the starting bar 87 is restored to undepressed position, an extension of the pawl 95 which overlies the top surface of the non-repeat pawl 79 returns said pawl counter-clockwise to ineffective position as said pawl 95 moves into effective position. The non-repeat pawl 79 is slightly longer than the release pawl 95, which prevents said pawl 95 from stumbling on the stud 97 upon restoration of the starting bar 87 and causes said stud 97 to obstruct clockwise movement of the pawl 79 to prevent said pawl from interfering with the releasing movement counter-clockwise of the key lock shaft 99. Restoring movement of the shaft 99 also releases the depressed amount, transaction, and clerk's keys, opens the switch 135 for the electric motor, and disengages the clutch mechanism which connects the motor to the machine operating mechanism.

Operating mechanism in two-cycle operations

In reading or resetting operations the main drive shaft 107 makes two counter-clockwise revolutions in order to operate the machine through the two cycles of movement necessary in such operations. In the well-known manner explained fully in the parent case, the shaft 118 is given a counter-clockwise movement prior to a two-cycle operation. This counter-clockwise movement of the shaft 118 (Fig. 1), by means of the arm 117, the link 116, and the lever 114, shifts the pitman 113 forward, which in turn rocks the link 102 counter-clockwise a slight distance, but not sufficiently to disengage the forward portion of the slot 119 from the stud 133.

This forward shifting movement of the pitman 113 moves a roller 134 carried thereby out of engagement with a notch in the heart of a cam 140 loosely assembled in a recess in the face of the gear 109, and alines said roller 134 with a camming groove 141 in said cam. Forward shifting movement of the pitman 113, by means of two studs 142 carried thereby which embrace a tongue 143 of a slide 144 mounted in a groove 145 in the cam 140, shifts said slide forward in unison therewith to engage a nose 146 thereof with a notch 147 in the gear 109. This fixedly connects the cam 140 to the gear 109 and consequently said cam moves in unison with the gear 109.

Clockwise rotation of the cam 140 causes the groove 141, in cooperation with the roller 134, to shift the pitman 113 forwardly an additional distance near the end of the first cycle of operation. This disengages the forward branch of the slot 119 in the link 102 from the stud 133 and alines the downward branch of said slot with said stud. It is, therefore, evident that when the camming portion of the groove 121 in the gear 109 rocks the lever 132 counter-clockwise during the first cycle of operation, the stud 133 will move idly in the downward branch of the slot 119 to prevent restoration of the key lock shaft 99 to untripped position, thus causing the machine to enter a second cycle of operation. After the first cycle of operation has been completed and the second cycle is well under way, the cam groove 141 returns the pitman 113 rearwardly to move the link 102 rearwardly and engage the forward branch of the slot 119 with the stud 133, so that, when one of the camming portions of the groove 121 rocks the lever 132 counter-clockwise, near the end of the second cycle of operation, the link 102 will move in unison therewith to restore the key lock shaft 99 to untripped position and terminate operation of the machine.

Amount keys, amount differential actuators, and totalizers

The details of the amount keys, the amount differential actuators, the totalizers, and their various controls are not necessary for an understanding of the instant invention and will not be given herein. These details may be found in the parent case, to which reference may be had.

In the usual manner the amount keys control the differential movement of the actuators, which in turn cause amounts to be entered into the totalizers. The actuators also set punch selectors in the punching means to enable the punching of the various entries to be made on record cards.

Punching mechanism

The punching mechanism functions in certain operations of the machine to record data entered into the cash register, and also other data which is set up by manipulative devices. The details of the punching mechanism which are necessary to an understanding of the instant invention will now be described. Reference may be had to the parent case for a full disclosure of further details of this mechanism.

Framework for punching mechanism

The punching mechanism is mounted on and between a right frame 393, a left frame 394, and an intermediate frame 395 (Figs. 4 and 6), spaced and maintained in proper relation to one another by means of cross bars 396, 397, 398, 399, and 400. The punching mechanism is mounted in a compartment in the left-half side of the drawer cabinet 84. The framework for the punching mechanism is connected to the machine proper by means of threaded studs 401 (Figs. 3 and 4) secured in the cross bars 399 and 400 and extending through the top 83 of the drawer cabinet, and the threaded upper ends of said studs 401 extend through holes in the machine base 82 and are secured in place by means of nuts. Bolts 402 (Fig. 4), threaded in extensions of the cross bar 398, have tenons on the lower ends thereof, which, in cooperation with holes in plates 403 secured on the top surface of a cross member 404 of the drawer cabinet, assist in locating and maintaining the punching mechanism in proper relation to the cash register portion of the machine.

Driving mechanism for the punching mechanism

It will be recalled that the main drive shaft 107 of the machine is driven one counter-clockwise rotation during adding operations and two counter-clockwise rotations in total and subtotal recording operations. The shaft 107 (Fig. 1) has fast thereon a gear 356, which drives the gear 775 carried by the stud 776, and gear 775 drives the gear 773.

Journaled in the side frame 393 and 394, which support the punching mechanism, are the shaft 566, which operates in certain machine operations, and the shaft 567, which operates in other machine operations, which shafts operate and control the punching mechanism in various operations. The gear 773 may be selectively connected to drive one or the other of these shafts as follows:

Secured on the shaft 566 (Fig. 1) is a clutch disc 770, a segmental portion of which cooperates with clutch dogs 771 and 772 pivoted on studs secured in the gear 773, which is loose on shaft 566. A spring 774 tensioned between the dogs 771 and 772 urges said dogs toward each other and into engagement with the segmental portion of the disc 770. The gear 773 also drives gear 777 and sleeve 778 loose on shaft 567. The control of the cooperation between the dogs 771 and 772 and the disc 770 will control the drive of the shaft 566 by the gear 773. When shaft 566 is driven, it causes a card to be punched and ejected and a new card to be fed into position to be punched.

Pivotally mounted on the gear 773, on the same studs which support the dogs 771 and 772, are an additional pair of dogs 779 and 780 (Fig. 2), urged toward each other by a spring 781 and into engagement with the segmental portion of a clutch disc 782 integral with the gear 783 loose on the shaft 566, said gear 783 meshing with a gear 784 secured on the shaft 567. It is evident that the drive of shaft 567 by the gear 773 is controlled by governing the cooperation between the dogs 779 and 780 and the clutch disc 782. The shaft 567 causes the shifting of a framework (Figs. 5 and 6) comprising side bars 462 and 463 and cross bars, as 464, which framework shifts the connectors 460 and 461 to select which field of the card will be perforated. The operation of shaft 567 also causes the punching of data in a certain field on the card, with the card remaining in punching position.

Figure 2:
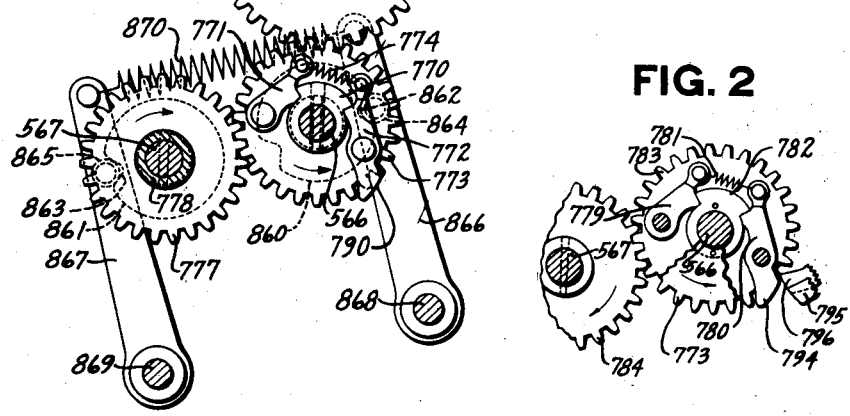
Fig. 2 is a detail of the controls and driving connections for a part of the punching mechanism.

A plurality of pawls, similar to pawls 795 and 796, partially shown in Fig. 2, are moved by various cash register and punching mechanism control means into and out of engaging relation with the foot-shaped extensions 790 and 794 on the dogs 772 and 780 respectively. When the pawls are moved into engaging relation, they will engage their corresponding dogs during an initial rotation of the shafts and cause the dogs to become disengaged from the segmental portion of their related discs and prevent further rotation of the shafts, thus determining which of the shafts is to be operated in any particular machine operation.

Secured on the right-hand end of the shafts 566 and 567, respectively, are discs 860 and 861 (Fig. 1) having V-shaped notches 862 and 863 therein, which, in cooperation with rollers 864 and 865, supported respectively by similar levers 866 and 867 free on studs 868 and 869 in the frame 393 and urged toward each other by a spring 870 stretched therebetween, retain said shafts 566 and 567 in home positions, when the shafts are not being operated, as here shown.

Punch selecting means

Ring gears such as 447 are mounted on discs 425 carried by rods 426, 432, and 433 supported in plates 428 and 429 fastened to a punch supporting frame 431. The amount differential actuators drive shafts such as 7, which in turn, through gears as 446 cooperating with internal teeth on the ring gears, position the ring gears differentially. The ring gears position punch selecting racks as 449, which have projections as 452 cooperating with the connectors of one or the other of upper or lower groups of connectors as 460 or 461, to select which of the punches 483 will be operable to punch data on the card.

Other ring gears are operated by levers such as levers 484, 486, and 487 (Fig. 4) and under control of the control keys of the cash register, to position other punch selecting racks, similar to racks 449, in order to control the selection of other punches used in perforating data on the cards.

The connectors 460 and 461 determine the zone on the card in which data is to be punched and are mounted in the framework composed of side bars 462 and 463 and cross bars as 464. The framework and connectors are shiftable vertically under control of the cash register mechanism by the cams 815, 816 coacting with rollers 817 and 818 to move the arms 820 and 821 connected to the framework.

Aliner for punching mechanism

An aliner mechanism is provided for alining the ring gears and their associated punch selecting racks. It will be recalled, by referring to Fig. 1, that the gear 773 drives the gear 777 and the sleeve 778 one clockwise revolution in adding operations and two clockwise revolutions in total and sub-total recording operations. This sleeve 778 (Fig. 5) drives a cam 894. The cam 894 has a camming groove 895, which engages a roller 896 on the upper end of a pitman 897 bifurcated to straddle an undercut portion of a hub 898 secured on the shaft 567. The lower end of the pitman 897 is slotted to receive a stud 899 in an extension of an arm 900, connected by a bail 901 to a similar arm, both of said arms being free on the rod 430. Secured on the bail 901 is an alining bar 902, which cooperates with alining teeth 903 in the ring gears as 447, which position the punch selecting racks.

After the ring gears and their corresponding punch selecting racks have been positioned in accordance with the depressed keys and the position of the manipulative levers, the cam 894 shifts the pitman 897 upward to rock the alining bar 902 into engagement with the teeth 903 to aline said ring gears and their corresponding punch selecting racks in set positions. After the punching mechanism has functioned, the alining bar 902 is disengaged from the teeth 903 and remains thus disengaged when the machine is at rest. A spring 904 (Fig. 5) forms a flexible connection between the pitman 897 and the arm 900 to compensate for any unevenness in the alinement of the teeth 903.

Mounting of punches

Figure 6:
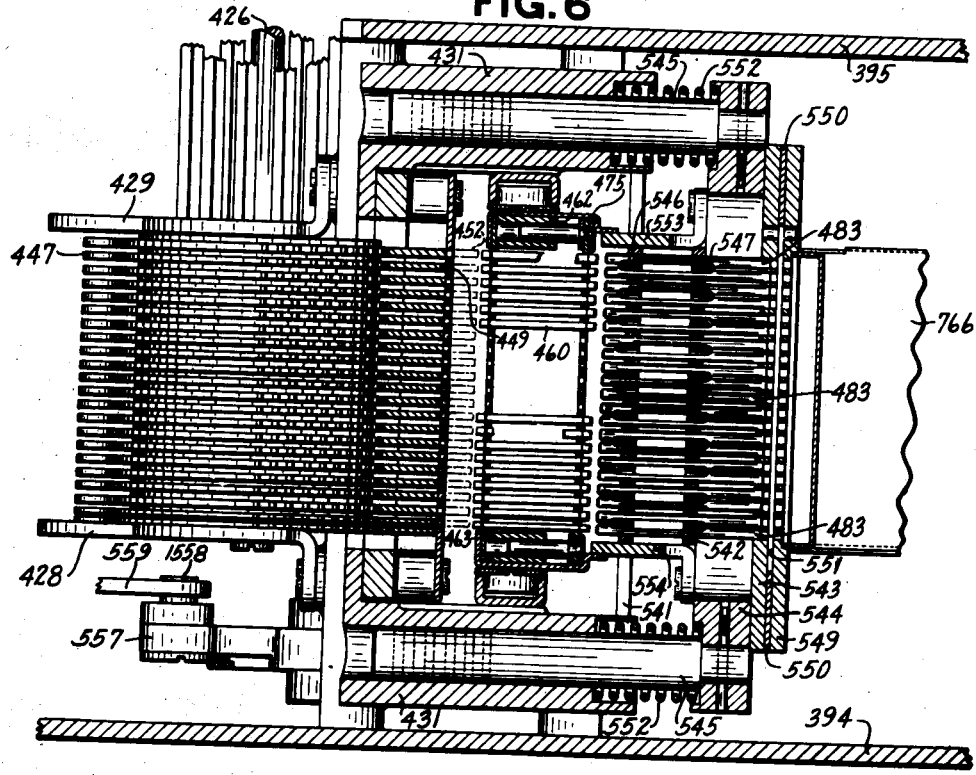
Fig. 6 is a sectional plan view illustrating the card punches and their associated selecting mechanism.

Referring to Figs. 5 and 6, each of the connector bars of the upper and lower groups has a corresponding punch 483, and said punches are mounted in relation to said connector bars by means of a fixed guide plate 541, secured to the frame 431, and movable guide plates 542 and 543, mounted on a die support plate 544 having secured thereto two guide pins 545 slidable in holes in the frame 431. The punches 483 fit freely in holes in the guide plates 541, 542, and 543, and are retained in proper position by means of undercut portions thereof in cooperation with wires 546 and 547 secured respectively to the guide plates 541 and 542 by retaining clips 548. The right-hand ends of the punches 483 are in alinement with corresponding holes in a die plate 549 integral with the guide plate 543 and spaced therefrom by strips 550 to form an aperture or throat 551 into which the record cards 1551 are fed preparatory to being punched.

After the punch selecting racks have been positioned, the punch and die unit, including the plates 542, 543, 544, and 549, is moved rearwardly or toward the left, as viewed in Fig. 6, against the action of compressible springs 552 coiled around the guide pins 545, by mechanism presently to be described. As the punch and die assembly moves rearwardly, the wires 547 move in unison therewith to free the punches, and the record card inserted in the throat 551 engages the ends of the punches 483 and carries said punches in unison with the die assembly.

Before the punches 483 are moved into contact with the forward ends of the connector bars in the framework 462 and 463 (Fig. 5), parallel bars 553 and 554 secured to the plate 544 simultaneously engage the cross pieces 475 of a pressure plate assembly for the group of connector bars in alinement with the punches, and carry said pressure plate in unison with the die assembly to free the connector bars for rearward movement in unison with the punches 483. Continued movement of the punch and die assembly causes the ends of the punches to engage the connector bars and carry said connector bars rearwardly in unison therewith until the noses 452 on the punch selecting racks interrupt the rearward movement of the connector bars corresponding to the position of said racks, which in turn interrupts the rearward movement of the punches corresponding to the position of the racks, and continued movement rearwardly of the punch and die assembly forces the punches, which have thus been stopped, through the record card contained in the throat 551 to punch the data relating to the transaction in said record card. The mechanism that moves the punch and die assembly rearwardly to punch the record card will now be described.

Directing attention to Figs. 4 and 6, the guide pins 545 have, cut in the lower surfaces thereof, teeth which mesh with partial gears 555, rotatably supported in borings in the frame 431. The gears 555 in turn mesh with gear sectors 556 and 557 secured on a shaft 558 journaled in downwardly extending ears of the frame 431. An extension of the sector 557 carries an adjustable eccentric stud 1558 embraced by the bifurcated downward extension of a lever 559 loose on a stud 560 secured in the frame 394. Angular extensions of the lever 559 carry respectively rollers 561 and 563, which cooperate respectively with the peripheries of plate cams 564 and 565 secured on corresponding shafts 566 and 567 journaled in the frames 393 and 394. The shaft 567 and the cam 565 operate the punching mechanism in certain machine operations, and the shaft 566 and the cam 564 operate the punching mechanism in all other operations of the machine.

The shafts 566 and 567 never work in unison. When one rotates the other is stationary, and vice versa, and said shafts perform respectively one counter-clockwise and one clockwise rotation during amount entering operations, and the shaft 566 makes two counter-clockwise rotations during certain total-recording operations. Rotation of the cams 564 and 565 in cooperation with their respective rollers 561 and 563 rock the lever 559 (Fig. 4) counter-clockwise to rock the sector 557, the shaft 558, and the sector 556 clockwise. Clockwise movement of the sectors 556 and 557, by means of their associated partial gears 555 in cooperation with the teeth in the guide pins 545, shift the punch and die assembly rearwardly against the action of the springs 552 to perforate the card in the manner explained above.

Card feeding and ejecting mechanism

When the record card is fed into the throat 551 (Figs. 9 and 16) between the plates 543 and 549, it is stopped in relation to the punches by two stop bars 568, which fit snugly in slotted openings in the plates 544, 543, and 549. The rearward ends of the stop bars 568 have openings therein, through which extend similar prongs formed on the bail of a yoke 569 secured on a shaft 570 journaled in the frames 394 and 395. Fast on the right-hand end of the shaft 570 is an arm 571 having pivotally connected thereto the lower end of a pitman 572, the upper end of which is bifurcated to straddle a collar on the shaft 566. The pitman 572 (Fig. 10) carries a roller 573, which is maintained in contact with the periphery of a plate cam 574, fast on the shaft 566, by a spring 575, one end of which is connected to an extension of the arm 571. After the card has been punched and while the punch and die assembly is being returned to card feeding and ejecting position, the node on the cam 574 engages the roller 573 and shifts the pitman 572 downwardly to rock the shaft 570 and the yoke 569 rearwardly to move the stop bars 568 in unison therewith to a position where they will not obstruct the throat 551, so that the punched card may be ejected therefrom.

The card feeding and ejecting mechanism includes two sets of pressure rollers 576 and 577 (Figs. 4, 9, 13, 15, 22, and 23) pivotally mounted on arms, in turn pivoted to bent-over ears on brackets 578 secured to the plate 544. A spring 579, tensioned between extensions of the arms that support the rollers 576 and 577, urges said rollers forward, so that, when the punch and die assembly is in feeding position, said rollers yieldingly engage corresponding feed rollers 580 and 581, mounted respectively on shafts 582 and 583 journaled in the frames 394 and 395.

Figure 7:
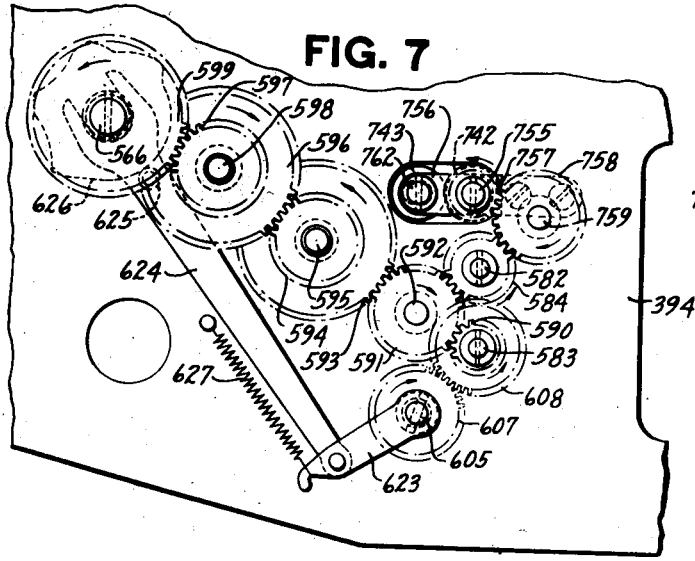
Fig. 7 is a detail view of the gears that drive the card feeding and ejecting mechanism for the card punching mechanism.

Referring to Figs. 7 and 13, the shafts 582 and 583 have secured thereon, respectively, gears 584 and 590, both of which mesh with a gear 591 loose on a stud 592 secured in the frame 394. The gear 591 meshes with a gear 593 integral with a gear 594, both of said gears being pivoted on a stud 595 in the frame 394. The gear 594 meshes with a gear 596 having secured thereto a gear 597, both of said gears being rotatably supported by a stationary stud 598 in the frame 394, and the gear 597 meshes with a gear 599 secured on the shaft 566. In adding operations and in certain total recording operations, the shaft 566 makes one revolution and, through the train of gears just described, rotates the card feeding shafts 582 and 583.

An ejector roller and its associated pressure roller are provided to assist the four sets of rollers just described in ejecting and stacking the punched cards. Secured on the die plate 549 (Figs. 4, 9, and 13) is a bracket 600, which rotatably supports a yoke 601 having pivotally mounted between the arms thereof a pressure roller 602. A spring 603 urges the yoke 601 and the roller 602 clockwise to normally maintain said roller in yielding engagement with an ejector roller 604 rotatable on a shaft 605 journaled in the frames 394 and 395. The ejector roller 604 is clutched to a sleeve 606 loose on the shaft 605, and said sleeve has secured to the left end thereof a gear 607 meshing with a gear 608 secured on the shaft 583, through the medium of which the pressure roller 604 is rotated in a clockwise direction.

The cam 564 (Fig. 4), which operates the punching mechanism, has three camming surfaces; namely, a punching surface, a feeding surface, and a non-feeding surface. After the record card has been punched, the feeding surface of the cam 564 comes into play and moves the punch and die assembly forward full distance to cause the pressure rollers 576 and 577 (Figs. 9, 10, and 13) to press the record card between said rollers and the feed rollers 580 and 581. During the movement of the punch and die assembly to feeding position, the cam 574 rocks the pitman 572 downwardly to shift the stop bars 568 rearwardly out of the path of the record card, whereupon rotation of the rollers 580 and 581 ejects the punched record card downwardly into engagement with the ejector rollers 602 and 604, which continue to eject the record card downwardly after it has moved beyond the feed rollers 577 and 581, and stacks said cards in a receiving tray 609.

*Card receiving tray*

The tray 609 is slidably mounted by means of flanged ways on either side thereof (Figs. 9, 13, and 20) in cooperation with inclined rails 610 and 611 integral with similar brackets 612 secured to the cross bars 396 and 397. The tray 609 is available through the closures 494 and 500 (see also Fig. 4) and may be slid forward to a more accessible position for removing the punched record cards when lock 501 has been unlocked and the closures 494 and 500 have been opened. Forward movement of the tray 609 is determined by a stud 613 in the right side thereof in cooperation with a depending bracket 614 secured to the rail 611, and said tray 609 is located in its rearward card receiving position by bent-over edges 615 on the forward end of said tray 609 in cooperation with the forward ends of the rails 610 and 611.

As the cards are ejected from the punching mechanism, they are stacked in sequential order, one behind the other, in the tray 609 between a bent-up back piece 635 of said tray and a slidable weight 616 similar to a book-end, and having a tongue 617 which fits loosely in a slot 619 in the bottom of the tray 609 (Figs. 9, 20, and 21), said tongue 617 being retained in said slot by a large-headed screw 620 threaded in the weight 616. As the punched cards are ejected into the tray, the weight 616 is pushed forward. The inclination of the tray 609, combined with the friction between the different parts, provides sufficient resistance against forward movement of the weight 616 to cause the punched cards to stack correctly in the tray 609.

A card pushing or vibrating mechanism is provided to assist in properly stacking the ejected record cards in the tray 609. This mechanism includes a combined guide and vibrator plate 621 (Figs. 9 and 13) secured to similar arms 622 fast on the shaft 605. Secured on the left-hand end of the shaft 605 (Figs. 7 and 13) is an arm 623, having connected thereto a pitman 624, the upper end of which is bifurcated to straddle a collar on the shaft 566. The pitman 624 carries a roller 625 maintained in contact with the periphery of a plate cam 626, fast on the shaft 566, by a spring 627, one end of which is connected to an extension of the arm 623. The cam 626 has thereon a series of nodes, which, in cooperation with the roller 625, imparts a series of oscillations or vibrations to the plate 621, initial movement of said plate 621 being in a counter-clockwise direction, as viewed in Fig. 9. This oscillation of the plate 621 tends to move the previously ejected record cards and the weight 616 up the inclined bottom of the tray 609, to provide room at the back of the stack for the next card to be ejected. This oscillating movement of the guide plate 621 also agitates or jiggles the cards at the back of the stack to insure that they stack properly in the tray 609. After the bottom edge of the card being ejected is guided by the plate 621 beyond the top edge of the last card in the tray 609, said plate 621 is rocked clockwise to release the pressure on the cards stacked in the tray, to facilitate the entrance of the card being ejected into the tray. By referring to Fig. 13 it will be observed that the guide plate 621 is cut away at the top to clear the ejecting roller 604, and said plate is also cut away at the bottom to clear the back piece 635 of the tray 609.

*Control of the operation of the machine by the card receiving mechanism*

Referring to Fig. 1, it will be recalled that depressing the starting bar 87 releases the key lock shaft 99 to the action of the spring 100, which immediately rocks said shaft counter-clockwise to render the clutch mechanism effective and close the circuit to the operating motor. This counter-clockwise movement of the shaft 99 causes an arm 628 (Fig. 3) secured thereon, in cooperation with a link 629 connected between said arm and an arm 630 loose on a shaft 631, journaled in the frame 81 and the printer frame, to rock said arm 630 counter-clockwise in unison with said shaft 99. Counter-clockwise movement of the arm 630 withdraws an arcuate surface 632 thereon from beneath a stud 633 in a switch arm 634 loose on the shaft 218, and releases said switch arm to the action of a spring 640, which immediately rocks said arm counter-clockwise. Counter-clockwise movement of the arm 634 disengages a nose 641 thereof from a shoulder on a clutch control disc 642 forming a part of the clutch assembly, which is rotatably supported by a stationary stud 643. Withdrawing the nose 641 from the shoulder of the disc 642 releases said disc to the action of a tensioned torsion spring (not shown), which rotates said disc 644, integral therewith, counter-clockwise.

Counter-clockwise rotation of the disc 644 moves a recess in the periphery thereof out of the path of a roller 645 on an arm of a yoke 646 loose on a shaft 647 journaled in the printer framework, causing said periphery to rock said yoke 646 counter-clockwise. Counter-clockwise movement of the yoke 646, by means of a link 648 connecting an arm of said yoke to an arm 649 loose on a fixed stud 650, rocks said arm 649 clockwise. A compressible spring 651 connects the arm 649 to a switch operating lever 652, also loose on the stud 650, through the medium of which clockwise movement of the arm 649 is transmitted to the switch operating lever 652, causing said lever to close the switch to start the motor. Counter-clockwise movement of the disc 642, when the nose 641 is disengaged therefrom, renders the clutch mechanism effective and connects the motor to the machine operating mechanism.

Near the end of a machine operation the lever 634 is restored clockwise, by mechanism not here shown but well known in the art, which causes the nose 641 thereof to engage the shoulder of the disc 642 to disengage the clutch mechanism and stop the recess in the periphery of the disc 644 opposite the roller 645 to permit the spring blades of the switch 135, which are tensioned upwardly, to break the circuit to the electric motor to stop operation thereof. Before the mechanism that returns the lever 634 clockwise by-passes said lever, restoration of the key lock shaft 99, by the mechanism shown in Fig. 1, moves the arcuate surface 632 of the arm 630 into the path of the stud 633 to retain the lever 634 in its clockwise position, as here shown.

Mechanism associated with the switch operating lever 652 (Figs. 3, 17, and 20) is provided to prevent operation of the machine when the card receiving tray 609 is filled with cards. The switch operating lever 652 is connected by a link 653 to one arm of a lever 654 loose on a hub 655 in the frame 395, said hub forming a bearing for one end of the shaft 582. A forward arm of the lever 654 carries a stud 656, which is embraced by a slot in a bent-over ear of a slide 657 shiftably mounted by means of parallel slots therein in cooperation with studs 658 in a bent-over portion of a bracket 659 secured to the frame 395. Clockwise movement of the lever 652 to close the switch 135, by means of the connections just described, moves the slide 657 upwardly in unison therewith, and it is readily seen that any obstruction placed in the path of said slide 657, to prevent this upward movement, would also block clockwise movement of the lever 652, thus preventing closing of the switch 135 and thereby forestalling operation of the machine.

As the tray 609 (Figs. 17 and 20) is filled with cards, the weight 616 is forced toward the right, as viewed in Fig. 20, causing a stud 660 carried thereby, in cooperation with a camming surface 661 on a lever 662 free on a stud 663 in the frame 395, to rock said lever 662 clockwise. Clockwise movement of the lever 662, through a slotted upward extension thereof in cooperation with a stud 664 in a lever 665 loose on a stud 666 in the bracket 659, rocks said lever 665 counter-clockwise contrary to the action of a spring 667. Counterclockwise movement of the lever 665 disengages a bent-over projection 668 thereof from a shoulder on a plunger 669, slidable in alined holes in the bent-over portion of the bracket 659 and a stud 670 secured in the frame 395 (see also Fig. 21).

When the plunger 669 is thus released, a compressible spring 671, encircling said plunger and confined between the bent-over portion of the bracket 659 and a collar secured on said plunger, shifts said plunger 669 rearwardly. Rearward movement of the plunger 669 causes a downward portion 672 of a block 673, integral therewith, to move over a block 674 secured to a left-hand extension of the slide 657. A guide pin 675 secured in the block 673 slides freely in a hole in the bent-over portion of the bracket 659 and maintains the portion 672 of said block in proper alinement with the block 674 and also maintains the locking shoulder on the plunger 669 in proper relation with the projection 668. When the block 673 moves into the path of the block 674, movement of the slide 657 and the lever 652 is obstructed. Therefore the switch 135 will not be closed upon depression of the starting bar, and operation of the machine is thus prevented.

Before the machine will operate, it is necessary to remove the punched cards from the tray 609 and return said tray and the weight 616 to their extreme left-hand positions, as shown in Fig. 20. Returning the weight 616 to its extreme left-hand position causes the stud 660, in cooperation with an extension 676 of a yoke 677 loose on a stud 678 in the frame 395, to rock said yoke clockwise. Clockwise movement of the yoke 677, by means of an upward extension 679 thereof, pushes the plunger 669 forward to disengage the block 673 from the block 674 and to reengage the locking shoulder on said plunger with the projection 668 of the lever 665. When the block 673 is thus moved out of the path of the block 674, the spring 651 immediately rocks the lever 652 clockwise to close the switch 135 to cause the machine to operate.

A spring 680 (Fig. 19), connected between the slide 657 and the frame 395, assists the spring blades of the switch 135 in returning the lever 652 and the slide 657 to normal positions, as shown in Fig. 17, at the end of a machine operation. A stud 682 in the bracket 659 (Fig. 20), in cooperation with the lever 665, limits the movement of said lever under influence of the spring 667 to maintain the projection 668 in proper relation to the plunger 669 and to maintain the camming surface 661 on the lever 652 in proper relation to the stud 660. An extension 683 of the yoke 677, in cooperation with the stud 670, maintains the extension 676 of said yoke in the path of the stud 660 and limits the rearward movement of the plunger 669.

Card feeler mechanism

If for any reason a new card is not fed into the throat 551 (Fig. 17) during an operation in which a new card should be fed into said throat, a card feeler device prevents the switch 135 from closing and thereby prevents operation of the machine, thus calling the operator's attention to this fact so that the condition may be remedied. Among the things that cause failure of a new card to be fed into the throat 551 are emptying of the card supply magazine, failure of the card feeding mechanism, jamming of a card in the throat 551, etc.

After the trouble has been ascertained and remedied, it is necessary to perform a blank machine operation in order to feed a new card into the throat 551, as this feeding takes place at the end of an operation instead of the usual practice of feeding said card at the beginning of an operation. Depression of the starting bar 87 (Fig. 1) and consequent releasing of the key lock shaft 99 make it impossible to recall the operation already initiated, whether the switch 135 closes or not. Therefore it is necessary to carry through this operation without the punching of a record card, and the general practice is for the operator to make a note of this fact so that a record card for this transaction may be later punched by hand. A manipulative device is provided for closing the switch 135 to cause the operation of the machine to be completed after the feeler mechanism has obstructed such closing of said switch.

It will be recalled that the shaft 566 (Fig. 17) makes one counter-clockwise revolution in all operations in which a punched card is issued. Rotation of the shaft 566 causes a camming groove 684 in a cam 690, secured thereon, in cooperation with a roller 691 on a lever 692 fulcrumed on a stud 693 in the frame 395, to rock said lever 692 clockwise near the end of a machine operation and then back to normal position. Clockwise movement of the lever 692 causes a bifurcated forward extension thereof, in cooperation with a stud 694 in an arm 695 loose on a stud 696 in the frame 395 (Figs. 17, 19, and 21), to rock said arm 695 counter-clockwise. Counter-clockwise movement of the arm 695, by means of a downward extension thereof in cooperation with a stud 697 in a yoke 698 fulcrumed on the stud 696, rocks said yoke counter-clockwise to move a rearward extension 699 thereof beneath a bent-over ear 700 of an angle bar secured to the die plate 549.

A bent-over portion 701 of a downward extension of the yoke 698 is slotted to straddle a reduced portion of a feeler pin 702 slidable in holes in the bent-over portion of the bracket 659 and the stud 670. The rearward end of the pin 702 is adapted to slide freely in alined openings in the plates 543 and 549. The extension 701, in cooperation with a collar 703 integral with the pin 702, shifts said pin forward against the action of a spring 704, encircling said pin 702 and confined between the bent-over portion of the bracket 659 and the collar 703, to move the rearward end of the feeler 702 out of the throat 551.

While the lever 692 and the arm 695 are dwelling in their clockwise and counter-clockwise positions, respectively, the die assembly, including the plates 543 and 549, is returned from punching position to feeding position, as shown in Fig. 19. This moves the projection 700 over the extension 699 of the yoke 698 to obstruct clockwise movement of said yoke when the cam 690 (Fig. 17) returns the lever 692 and the arm 695 to normal position, as here shown. Obstructing the clockwise movement of the yoke 698 causes the extension 701 thereof, in cooperation with the collar 703, to hold the feeler pin 702 in ineffective position, to prevent it from interfering with the ejecting and feeding of the record cards.

After the punched card has been ejected from the throat 551 and a new card has been fed therein, the die assembly, including the plates 543 and 549, is moved to a neutral position, as indicated by dot-and-dash lines in Fig. 19, which moves the projection 700 out of engagement with the extension 699 to release the yoke 698 and the feeler 702 to the action of a spring 704, which immediately moves said feeler rearwardly to feel the throat 551 for the presence of a record card. If, through failure of the feeding mechanism to function properly, or some other cause, a new card is not carried into the throat 551, rearward movement of the feeler 702 is unobstructed and such movement carries a projection 705 of a block 706, secured on the right-hand end of said feeler 702, into the path of the block 674 to obstruct upward movement of the slide 657 and clockwise movement of the lever 652 (Fig. 17) when an attempt is made to operate the machine.

The block 706 carries a guide pin 707, which slides freely in a hole in the bent-over portion of the bracket 659 to maintain the projection 705 of said block in proper alinement with the block 674. The presence of a card in the throat 551 (Fig. 19) obstructs rearward movement of the feeler 702 and holds the projection 705 of the block 706 out of the path of the block 674, where it will not interfere with operation of the machine.

If the feeler mechanism has disabled the switch 135, the operator will be notified of this fact when an attempt is made to operate the machine, and in such a case the operator usually makes a note to the effect that no card will be issued for this particular transaction, so that a card may be made for said transaction later in some other way. After the starting bar has been depressed, it is impossible to recall or cancel this operation, and, in order to complete said operation, the operator pulls a switch release bar 707 (Figs. 17 and 21) mounted in parallel slots in the bent-over ends of the bracket 659, causing a horizontal slot in the rearward end of said bar, in cooperation with the stud 697 in the downward extension of the yoke 698, to rock said yoke counter-clockwise. Counterclockwise movement of the yoke 698 shifts the feeler pin 702 forward to move the block 706 out of the path of the block 674 to permit the switch mechanism to operate, whereupon operation of the machine is completed. When the bar 707 is released, a spring 708 returns said bar rearwardly to normal position, as shown in Fig. 17, and during operation of the machine the feeler 702 again feels for the presence of a card in the throat 551.

An on-and-off lever is provided for enabling or disabling the card-punching mechanism. This lever is secured on the shaft 492 (Figs. 18 and 21), and moving said lever clockwise to "off" position rocks said shaft 492 and an arm 709 secured thereon to move a raised surface on said arm into the path of a nose 710 on the yoke 698. This obstructs clockwise movement of the yoke 698 and prevents the feeler 702 from disabling the switch 135 when no card is in the throat 551 and the lever is in "off" position.

*Card supply magazine*

A supply magazine 711 (Figs. 4 and 9) for the record cards has a framework, the sides and bottom of which form a receptacle for the blank record cards. The supply magazine 711 has flared side plates 712 and a flared top plate 713, which guide the record cards to the blade 714 of a picker device, which also is supported by the frame of the supply magazine 711. The cards are advanced through the guide plates 712 and 713 to the picker blade 714 by a spring-pushed pressure plate 715 having fixed thereto a rod 716, opposite ends of which extend through slots in tubular side members 717 mounted between the plates 712 and brackets secured to the forward end of the magazine, and said ends of the rod 716 fit loosely in holes in bearings 719 loose in the tubular side members 717. Compressible springs 720, confined between the bearings 719 and screw plugs in the ends of the tubular side members 717, urge the pressure plate 715 rearwardly to advance the record cards to the picker blade 714. A bail 721 connected to the pressure plate 715 provides means for pulling said plate forward and holding said plate against the action of the springs 720 when it is desired to insert new cards in the magazine 711.

The supply magazine 711 is accessible through the closure 500, and when said closure is opened, said magazine may be slid forward to a more accessible position for inserting new cards. The magazine 711 is slidably mounted by means of horizontal trunnions 722 thereon (Figs. 4, 9, and 14), in cooperation with horizontal slots 723 in plates 724 secured to the frames 394 and 395. The magazine 711 is locked in feeding position by means of spring-pushed pins 725, in cooperation with corresponding holes in the frames 394 and 395. The pins 725 are connected to respective companion pinch levers 726 pivotally mounted between a plate 727 and the frame of the magazine 711. A spring 728, tensioned between extensions of companion levers 726, urges the pins 725, which are slidably mounted in holes in the frame of the magazine 711, into their respective locking holes in the frames 394 and 395. The pins 725 are guided into their respective locking holes by notches 729 in the plates 724.

To move the supply magazine 711 from feeding position, in which it is shown in Fig. 9, to loading position, it is necessary to compress the companion levers 726 to remove the pins 725 from their respective holes in the frames 394 and 395, whereupon the magazine 711 may be moved forward through the closure 500 to loading position, which position is determined by the forward trunnions 722 contacting the forward ends of the slots 723. The magazine 711 may be easily removed from the machine for repair or adjustment by moving said magazine forward from feeding position to a position where the trunnions 722 are in alinement with an opening in the forward ends of the slots 723 in the plates 724, whereupon said magazine may be tilted up and slid forward until disengaged from the plates 724.

The picker blade 714 (Figs. 9 and 11) is adjustably mounted upon an angular surface on the top of a cross-head 730 mounted for vertical sliding movement upon two guide pins 731 secured in the framework of the magazine 711. Protruding from opposite ends of the cross-head 730 are trunnions 732 embraced respectively by the bifurcated forward extensions of levers 733 pivoted on stationary studs 735 in the frames 394 and 395. Each of the levers 733 has mounted thereon rollers 736 and 737, which cooperate respectively with the peripheries of companion plate cams 738 and 739 secured on the shaft 566. Counterclockwise rotation of the shaft 566 and the cams 738 and 739 causes said cams, near the end of machine operation, to rock the levers 733 clockwise to shift the cross-head 730 and the picker blade 714 downward. Downward movement of the picker blade picks the first card out of the magazine and forces said card down through a restricted aperture, wide enough to admit only one card at a time and formed by a block 740 (Fig. 12) and an adjustable rail 741, both of which are secured to the framework of the magazine 711.

The picker blade 714 carries the card between feed rollers 742 and 743, which revolve in opposite directions and feed the record card into the throat 551 and into engagement with the upper set of feed rollers 580 and their corresponding pressure rollers 576, which, in cooperation with their associated feed rollers 581 and pressure rollers 577, carry the card down into contact with the stop bars 568, while the punched card is being deposited in the tray 609. It will be understood that, when the card is being fed into the punching mechanism by the picker blade 714 and the feed rollers, the throat 551 is in alinement with the rollers 742 and 743 and the pressure rollers 576 and 577 are in yielding contact with their respective feed rollers 580 and 581.

After the new card has been fed into contact with the stop bars 568, the die assembly, including the plates 543 and 549, is moved from feeding position to normal position, as shown in Fig. 9. This separates the pressure rollers 576 and 577 from their respective feed rollers and causes said rollers to resiliently press the new card against the plate 549 (Fig. 15) to retain said card in proper location in the throat 551.

Sometimes, due to unequal pressure and friction, the cards may become cocked, as they are advanced through the aperture formed by the block 740 (Fig. 11) and the rail 741, by the picker blade 714. In order to overcome this difficulty, spring-pushed fingers 744 and 745 (Figs. 11 and 12) pivoted on pins supported by a plate 746 secured to the framework of the supply magazine 711 are provided. The fingers 744 and 745 are urged upward by torsion springs 747 into contact with corresponding projections of the bottom plate 748 of the supply magazine 711, and the spring pressure thereon retains the first few cards in the magazine in proper alinement with the card feeding mechanism. As the picker blade 714 moves down, downward extensions of a back plate 749, secured to the cross-head 730, engage the fingers 744 and 745 and push said fingers down out of the path of the card being advanced from the supply magazine to the feed rolls. The fingers 744 and 745 (Figs. 9, 11, and 12), in cooperation with the extensions of the plate 749, also retain the trunnions 732 in alinement with the bifurcated extensions of the levers 733 when the supply magazine 711 is shifted forward to loading position or removed from the machine, so that said trunnions 732 will readily engage their corresponding levers when the magazine is returned to feeding position.

Figure 8:
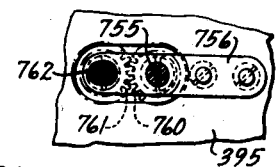
Fig. 8 is a detail view of the gears and shafts that drive the feed rollers which receive the cards from the picker device.

The feed roller 742 (Figs. 7, 8, 9, and 13) is integral with a shaft 755, opposite ends of which are journaled in identical bearing blocks 756 secured to the frames 394 and 395. Fast on the left-hand end of the shaft 755 is a gear 757, which meshes with a gear 758 rotatable on a stationary stud 759 in the frame 394, and said gear 758 meshes with the gear 584, which, it will be recalled, drives the shaft 582 for the upper set of feed rollers 580. Fast on the right-hand end of the shaft 755 is a gear 760, which meshes with a similar gear 761 secured on the right-hand end of a shaft 762 journaled in horizontal slots in the bearing blocks 756, and said shaft has integral therewith the feed roller 742. The roller 743 (Figs. 4 and 9) is urged into yielding engagement with its associated roller 742 by spring-pushed plungers 763, the heads of which form half-round bearings for the shaft 762 and the tenons of which fit freely in holes in the frame 431. Compressible springs 764, for the plungers 763, are assembled in the holes for said plungers and are confined between the ends of the tenons of said plungers 763 and screw plugs 765 threaded in the holes for said tenons. The screw plugs 765 provide means for adjusting the pressure of the roller 743 to cause the cards to be properly fed into the throat 551. The gears shown in Figs. 7 and 8, and described above, rotate the feed rollers 742 and 743 counter-clockwise and clockwise, respectively, to feed the record cards, advanced therebetween by the picker mechanism, into the throat 551.

The slugs that are punched from the record cards are guided by a chute 776 (Figs. 4 and 5), secured to the die plates 549, into a receiving tray 767 which fits in a pocket formed by the frame 394 and the bracket 612 which supports the left-hand side of the tray 609, and a plate 768 secured to the cross-bars 396 and 397. Like the supply magazine 711 and the receiving tray 609 for the record cards, the slug tray 767 is accessible through the closure 500 and may readily be removed for emptying by means of a curved finger piece 769 on the forward end thereof.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In an electrically-operated combined cash register and card-punching machine, adapted to issue punched record cards, the combination of means to release the machine for operation; a switch operated by the releasing means whenever the machine is to be set in motion; means to punch records in the card; a throat in the punching means to position the cards in relation to said punching means; means to feed the cards into the throat; a feeler device adapted to feel the throat for the presence of a card; means whereby the feeler device obstructs operation of the switch when no card is in the throat; and a manipulative device to return the feeler and the obstructing means to ineffective positions to enable the switch to close and the machine to be operable even though no card is in the throat.

2. In a machine of the character described, adapted to issue punched record cards, the combination of means including a shiftable device to punch records in the cards, said shiftable device adapted to be moved to and from feeding position; a throat in the shiftable device to receive the cards to be punched; means to feed the cards into the throat, when the shiftable device is in feeding position; means to feel the throat for the presence of a card; means on the shiftable device to retain the feeling means in ineffective position when said shiftable device is in feeding position, movement of the shiftable device from feeding position allowing the feeling means to function; means whereby the feeling means prevents subsequent operation of the machine if no card is in the throat; and a manipulative device to render the preventing means ineffective to enable the machine to operate when no card is in the throat.

3. In an electrically-operated combined cash register and card-punching machine, adapted to issue punched record cards, the combination of means to release the machine for operation; a switch operated by the releasing means whenever the machine is to be set in motion; means including a shiftable device to punch records in the cards; a throat in the shiftable device to hold the cards while said cards are being punched; means to move the shiftable device to and from feeding position; means rendered effective by movement of the shiftable device to feeding position to feed the cards into the throat; means to feel the throat for the presence of a card; means whereby the shiftable device retains the feeling means in ineffective position while said shiftable device is in feeding position, movement of said feeding device away from feeding position allowing the feeling means to function; means rendered effective by the feeling means, when no card is in the throat, to prevent operation of the switch to forestall operation of the machine; and a manipulative device to move the preventing means to ineffective position to enable the machine to operate even though no card is in the throat.

4. In an electrically-operated combined cash register and card-punching machine, adapted to issue punched record cards, the combination of means to release the machine for operation; a switch operated by the releasing means, whenever the machine is to be set in motion; means, including a shiftable device, to punch records in the cards; a throat in the shiftable device to hold the cards while being punched; means to feed the cards into the throat; means to move the shiftable device into and out of alinement with the feeding means; means to feel the throat for the presence of a card; means to restore the feeling means to ineffective position each machine operation; means on the shiftable device to retain the feeling means in ineffective position when said shiftable device is in alinement with the feeding means, movement of the shiftable device out of alinement with the feeding means enabling the feeling means to feel the throat for the presence of a card; means whereby the feeling means renders the switch inoperative when no card is in the throat; and a manipulative device to move the feeling means and the rendering means to ineffective positions to render the machine operable when no card is in the throat.

5. In an electrically-operated combined cash register and card-punching machine, adapted to issue punched record cards, the combination of means to release the machine for operation; a switch operated by the releasing means whenever the machine is to be set in motion; a plurality of punches for punching records in the record cards; a card holder to present the cards to the punching means; means to feed the cards to the card holder; a spring-actuated feeler device to feel the holder for the presence of a card; means to retain the feeler in ineffective position while a card is being fed into the holder, said retaining means being rendered ineffective upon completion of the card feeding, whereupon the feeler becomes effective; means whereby the feeler renders the switch inoperative, to forestall operation of the machine when no card is in the holder; and a manipulative device to return the feeler to ineffective position to enable the machine to be operated even though no card is in the holder.

6. In an electrically-operated combined cash register and card-punching machine, adapted to issue punched record cards, the combination of means, including a shiftable device to punch records in the cards; a throat in the shiftable device to hold the card while being punched; means to feed the cards into the throat; means to move the shiftable device into and out of alinement with the feeding means; means to feel the throat for the presence of a card; means to restore the feeling means to ineffective position each machine operation; means on the shiftable device to retain the feeling means in ineffective position when said shiftable device is in alinement with the feeding means, whereupon movement of the shiftable device out of alinement with the feeding means allows the feeling means to feel the throat for the presence of a card; means controlled by the feeling means to render the machine inoperative when no card is in the throat; and a manipulative device to move the feeling means to ineffective position to enable the machine to be operated when no card is in the throat.

7. In a machine of the class described, adapted to issue punched record cards, the combination of a receptacle for the punched cards; a slidable card-stacking member in the receptacle; means operated by the member to render the machine inoperative when the receptacle is filled with cards; and means whereby the member restores the first-mentioned means to ineffective position when the tray is empty.

8. In a combined cash register and card-punching machine, adapted to issue punched record cards, the combination of a receptacle for the punched cards; a slidable card-stacking member in the receptacle, said member adapted to be moved from a starting position to an extreme position as the receptacle fills with cards; means operated by the member, when moved to its extreme position, to render the machine inoperative; and means whereby returning the member to starting position, after the cards are removed from the receptacle, restores the rendering means to ineffective position to cause the machine to operate.

9. In a machine of the class described, adapted to issue punched record cards, the combination of a receptacle for the punched cards; a slidable member in the receptacle, said member adapted to be moved from starting position to an extreme position by the punched cards as they are deposited in the receptacle; means, including a spring plunger released by the member when in its extreme position, to prevent operation of the machine when the receptacle is filled with cards; and means operated by the member when returned to starting position to restore the plunger to ineffective position to cause the machine to operate.

10. In an electrically-operated combined cash register and card-punching machine, adapted to issue punched record cards, the combination of means to release the machine for operation; a switch operated by the releasing means, whenever the machine is to be operated; a receptacle for the punched cards; a slidable member mounted in the receptacle, said member adapted to be moved from a minimum position to a maximum position by the punched cards as they are deposited in the receptacle; means to block operation of the switch to prevent operation of the machine; normally effective means to retain the blocking means in ineffective position, said retaining means adapted to be rendered ineffective by the slidable member when said member is in maximum position, whereupon the blocking means becomes effective; and means whereby returning the member to starting position returns the blocking means into engagement with the retaining means to cause the machine to operate.

11. In an electrically-operated combined cash register and card-punching machine, adapted to issue punched record cards, the combination of means to release the machine for operation; a switch operated by the releasing means whenever the machine is to operate; a receptacle for the punched cards; a slidable member in the receptacle, said member adapted to be in a minimum position when the receptacle is empty and adapted to be moved to a maximum position when the receptacle is filled with cards; yieldingly operated means to obstruct operation of the switch, to prevent operation of the machine; means to retain the obstructing means in ineffective position; means whereby the member moves the retaining means to ineffective position when said member is in maximum position, whereupon the obstructing means becomes effective; and means operated by the member when returned to minimum position to reengage the obstructing means with the retaining means to cause the machine to operate.

12. In an electrically-operated combined cash register and card-punching machine, adapted to issue punched record cards, the combination of means to release the machine for operation; a switch operated by the releasing means whenever the machine is to operate; a receptacle for the punched cards; a slidable member mounted in the receptacle and adapted to assist the cards in stacking properly in the receptacle, said member also adapted to be in a minimum position when the receptacle is empty, and in a maximum position when the receptacle is filled; means operated by the member when in maximum position to block operation of the switch to prevent operation of the machine when the receptacle is filled; and means whereby returning the member to minimum position, after the receptacle is empty, returns the blocking means to ineffective position to cause the machine to operate.

13. In a machine of the class described, adapted to issue punched record cards, the combination of a receptacle for the punched record cards; a slidable member in the receptacle, said member adapted to be in a minimum position when the receptacle is empty and adapted to be moved to a maximum position when the tray is filled with cards; a yieldingly operated element to prevent operation of the machine; means to retain the element in ineffective position; means whereby the member moves the retaining means to ineffective position when said member is in maximum position, whereupon the element becomes effective; and means operated by the member when returned to minimum position to reengage the element with the retaining means to cause the machine to operate.

GUNNAR NELSON.